Jan. 14, 1947.    J. S. BOGEN ET AL    2,414,356
APPARATUS FOR TESTING PRIME MOVERS
Filed Jan. 14, 1944
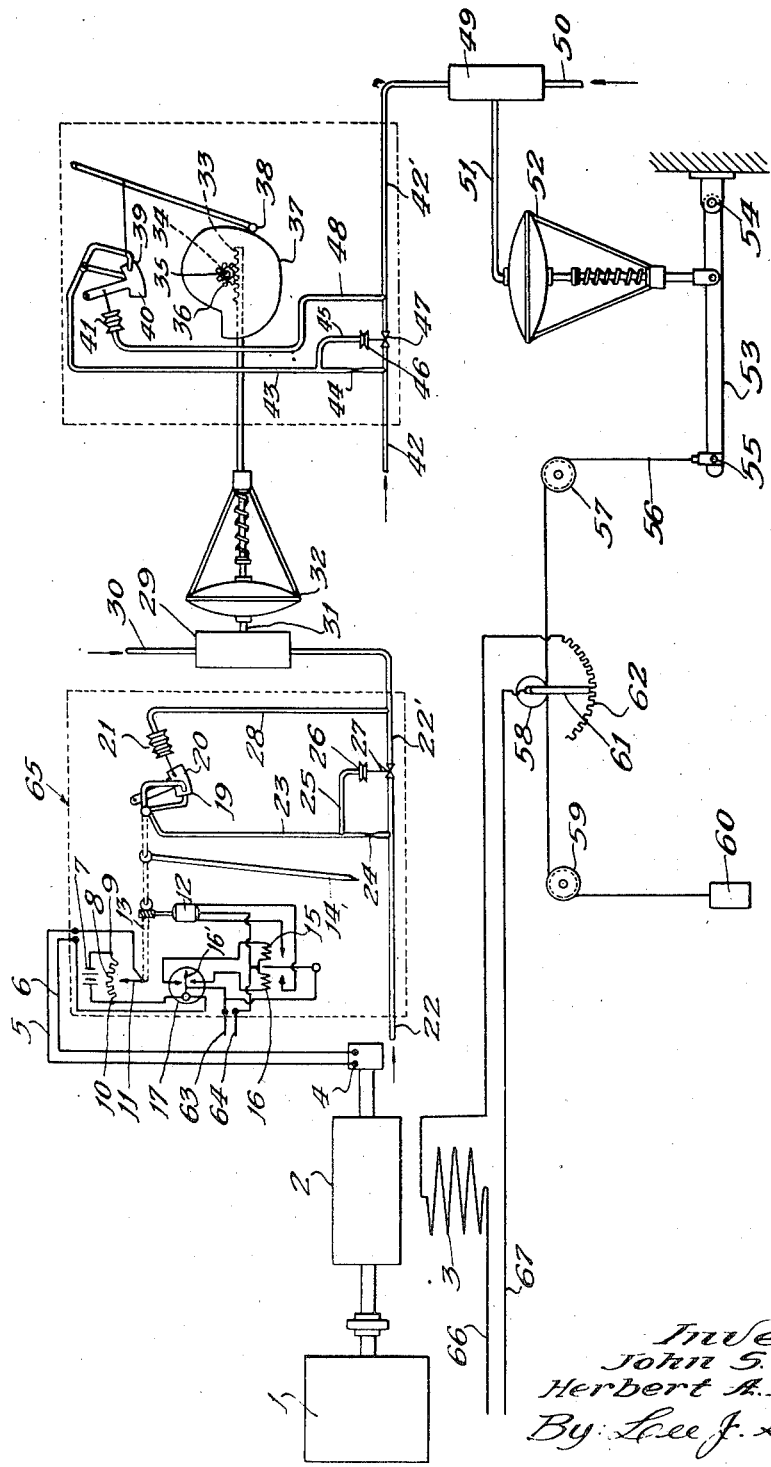
Inventors
John S. Bogen
Herbert A. Hulsberg
By Lee J. Gary
Attorney Patented Jan. 14, 1947

2,414,356

UNITED STATES PATENT OFFICE 2,414,356

APPARATUS FOR TESTING PRIME MOVERS

John S. Bogen and Herbert A. Hulsberg, Riverside, Ill., assignors to Universal Oil Products Company, Chicago, Ill., a corporation of Delaware Application January 14, 1944, Serial No. 518,246

7 Claims. (Cl. 73—116)

This application is a continuation-in-part of our co-pending application Serial No. 411,468, filed September 19, 1941.

This invention relates to an improved form of apparatus for testing prime movers and more particularly to a load imposing means by which it is possible to duplicate in the laboratory the loading conditions to which prime movers such as internal combustion engines and the like may be subjected in actual operation.

There are many tests to which internal combustion engines are submitted and it is one object of this invention to provide means for automatically duplicating any specific speed-torque relation in the laboratory to simulate various road load conditions such as might be encountered by an automobile engine. With the present invention it is possible to run performance tests of various kinds on various engines in the laboratory under load conditions substantially the same as those obtained in actual service.

In addition to utilizing the present invention for the testing of prime movers it will also be found advantageous for use in other tests, for example, one type of test which may be conducted with the aid of this invention is any of the various road test determinations of antiknock ratings of motor fuels.

One of the important advantages obtainable when conducting tests in the laboratory is the fact that the condition variables encountered when conducting road tests may be brought under the control of the investigator. These variables may comprise, either alone or in combination, any number of the following: grade of the road upon which the test is conducted, weather and atmospheric conditions, coolant temperatures, air fuel mixture ratios, speed at which test is run, and air and fuel inlet temperatures and pressures. By conducting synthetic road tests in the laboratory any desired set of these operating conditions may be selected and controlled at will, thus, making a very flexible arrangement for the investigation of both internal combustion engines and motor fuels.

Another advantage obtainable upon employing the present invention is the ready adaptability of the apparatus to any type of prime mover, and the ease with which a load of any predetermined speed-torque characteristic may be imposed on the prime mover and also the ease of shifting from one speed-torque relation to another. With the present invention it is possible to simulate the loading on a prime mover when used in any of many forms of service, for instance, the loading to which an internal combustion engine may be subjected when used in a motor car or any other form of transportation vehicle, i. e., airplanes, boats and the like.

The principal feature of the present invention resides in a cam of predetermined contour by which means the load imposed by the dynamometer is made to follow any speed time curve, e. g., in making acceleration performance tests on an automobile engine the cam may be cut so that its contour will maintain the same speed torque relationship as that encountered on the road.

Additional features and advantages of this invention will be made more apparent and clearly understood with reference to the accompanying diagrammatic drawing which illustrates schematically a preferred form of apparatus embodying the features of the invention.

Referring to the drawing numeral 1 denotes a prime mover, for example, an internal combustion engine which is being subjected to test. This engine may be suitably mounted on a test stand which not being a part of the invention is not illustrated. A suitable electric dynamometer 2 is connected to and operated by the prime mover and is also connected to and operates a magneto-type tachometer 4. The tachometer generates electrical current, the potential of which varies in direct relation to its speed of rotation. One output lead 6 of the tachometer is connected in series with galvanometer 17 and terminates at one end 10, of the potentiometer resistor 8. The other lead 5 of the tachometer is connected to the movable contact 11 of the potentiometer. Battery 7 is connected across the two terminals 9 and 10 of the potentiometer resistor 8. Reversing control motor 12 through a speed reducing gear drives shaft 13 to which are attached movable contact 11, pen arm 14, and movable nozzles 19.

When the voltage developed by tachometer 4 is equal and opposite to the voltage between the terminal 10 of resistor 8 and contact 11, no current flows through the galvanometer 17. If the speed of the tachometer increases the voltage increases, current flows through the galvanometer 11 and its movable contact 16' completes a circuit through one of the relays 15 or 16 which operates to complete the circuit through motor 12. Current for energizing motor 12 may be obtained by connecting electrical conductors 63 and 64 to a suitable source, such as a battery. Motor 12 rotates contact 11 to the right in the drawing to increase the voltage between terminal 10 and movable contact 11 until this voltage equals the tachometer output voltage. When the voltages are equal, current flow through the galvanometer stops and the circuit through the relay is broken thus stopping the motor. If the speed of the tachometer decreases, its voltage output decreases and current flows through the galvanometer in the opposite direction to cause its movable member 16' to complete a circuit through the other relay to energize the motor for reverse rotation. Thus, motor 12 maintains movable contact 11 in a position at which the voltage between terminal 10 and movable contact 11 is equal to the voltage developed by the tachometer and varying directly with the speed of the prime mover.

Air at a controlled pressure is supplied to the apparatus through conduit 22 and a portion thereof is directed through conduit 23 and a suitable restriction orifice 24 thereby supplying movable nozzles 19. Nozzles 19 are rotated by shaft 13 to a position which corresponds to the tachometer speed. Between nozzles 19 is a movable vane 20 which is displaced angularly by bellows 21. As the speed of the tachometer increases nozzles 19 will be rotated away from the vane 20 thus decreasing the resistance to air escaping from conduit 23. This will decrease the pressure within conduit 23 and conduit 25 connected thereto. This decrease in pressure will cause bellows 26 to contract thus opening valve 27 to increase the pressure in the conduit 22' and in conduit 28 connected thereto. Increase in pressure in conduit 28 which communicates with bellows 21 will cause the latter to expand until vane 20 is again positioned between the nozzles 19 thus, the pressure in conduit 22' will be dependent upon the angular position of nozzles 19 which in turn is dependent upon the speed of tachometer 4.

Conduit 22' is connected to valve positioner 29 which by means of changes in the pressure in line 22' causes air pressure supplied through conduit 30 to be communicated by conduit 31 and imposed upon diaphragm motor 32. A conventional type of valve positioner is illustrated in Patent 2,061,118 to William H. Vogt. With increases in pressure in conduit 22' valve positioner 29 increases the pressure imposed upon the diaphragm motor 32, and with decreases in pressure in conduit 22' the valve positioner relieves the pressure imposed upon diaphragm motor 32.

Diaphragm motor 32 functions to longitudinally displace rack 33 which engages gear 34. Gear 34 is attached to shaft 35 and to the latter by means of a threaded nut 36 is attached cam 37. By means of tachometer 4 instrument 65 rack 33 and gear 34, cam 37 is rotated to a position which corresponds to the speed of the prime mover being tested. For any speed of the prime mover being tested there is a corresponding position to which cam 37 will be rotated. Cam 37 may be cut to any configuration (plotted on polar coordinates) which will function to cause the load imposed by dynamometer 2 on prime mover 1 to follow any speed load curve desired. Any number of cams may be made up so that tests at different speed load relationships can be made in rapid succession. We have found when conducting tests on internal combustion engines usable in motor cars that when the contour of this cam corresponds to a speed time acceleration curve for a vehicle in which the particular prime mover or substantially the same prime mover is employed very successful tests are obtained. A speedtime acceleration curve is obtained by plotting speed against elapsed time when accelerating at constant throttle.

Associated with cam 37 is cam follower 38 which is coupled to movable nozzles 39. Air at controlled pressure is supplied to this instrument through conduit 42 and a portion thereof is diverted through a suitable restriction orifice 44 and conduit 43 to movable nozzles 39. As cam follower 38 moves to the right in the drawing movable nozzles 39 also move to the right reducing the resistance to air flow therethrough and causing the pressure in conduit 43 to decrease. This decrease in pressure is communicated by conduit 45 to bellows 46 causing the latter to contract and function to open valve 47. The opening of valve 47 increases the pressure in conduits 42' and 48, the latter of which communicates with bellows 41 thus causing it to expand and move vane 40 into position between nozzles 39. When vane 40 is positioned between nozzles 39 the flow of air therethrough is again restricted and valve 47 is moved toward a closed position.

Conduit 42' transmits the changes in air pressure to valve positioner 49 which functions to regulate the air supplied at controlled pressure through conduit 50 to cause increases or decreases of pressure in conduit 51 which communicates with diaphragm motor 52. Diaphragm motor 52 is connected to lever 53 which in turn is pivoted at point 54. A suitable cable or wire rope 56 is attached to lever arm 53 at point 55 and passes over pulley 57 around drum 58 over pulley 59 and terminates in a weight 60 which is of sufficient mass to maintain cable 57 tightly snubbed around drum 58. Contactor arm 61 is attached to drum 58 and rotates therewith through the arc formed by resistor 62. The contactor arm 61 and one end of resistor 62 are connected in series with field coil 3 of dynamometer 2 and a suitable source of electrical current by means of electrical conductors 66 and 67.

When the speed of prime mover 1 increases the voltage output of tachometer 4 increases and instrument 65 functions to increase the pressure on diaphragm motor 32. This causes rack 33 to be displaced longitudinally to the right in the drawing and, with the cam illustrated, the movement of cam follower 38 is also to the right. This, as was previously described, causes an increase in the pressure on diaphragm motor 52 which displaces lever 53 downwardly in the drawing and cable 56 connected thereto causes the rotation of contactor 61 to the right with the consequential reduction in the resistance in the field circuit of the dynamometer thereby increasing the torque imposed upon the prime mover.

The present invention may be used to impose upon a prime mover a load of any predetermined torque-speed characteristic desired by substituting a suitable cam. The cam is readily removed and another substituted therefore to give the proper torque-speed relationship desired without replacement or rearrangement of any of the other testing equipment. For instance, an internal combustion engine is to be tested for use in several different body styles of automobiles and/or different road conditions. It is only necessary to make one road test for each body style and/or various road conditions in order to plot the speed-time acceleration curve to which the cam is cut. After the cams are cut it is possible to run extensive simulated road tests in the laboratory using only the one engine and adapting the testing equipment to the different body styles and/or different road conditions by merely substituting the corresponding cam. This feature is not only a matter of convenience in testing, but also it permits rapid changes from one speed load curve to another.

In addition to automobile and truck engine tests many other tests may be conducted with the apparatus of the present invention. For example, a load having the torque-speed characteristic of an airplane propeller may be simulated by substituting a properly cut cam.

It is to be understood that the combination of specific apparatus illustrated in the drawing is only one of the many arrangements which can be used to satisfactorily accomplish the invention.

We claim as our invention:

1. An apparatus for simulating service loading conditions for prime movers which comprises in combination a load imposing dynamometer adapted to be driven by said prime mover, a control instrument including a cam, means responsive to the speed of said dynamometer for driving said cam in one direction in response to an increase in the speed of said dynamometer and in the opposite direction in response to a decrease in said speed, a cam follower associated with said cam and means responsive to changes in the position of said cam follower for varying the load imposed by the dynamometer, said cam being readily replaceable with cams of various other contours by means of which other speed-torque loading characteristics may be imposed upon said prime mover without rearrangement of other portions of the apparatus.

2. An apparatus for simulating service loading conditions for prime movers which comprises in combination a load imposing dynamometer adapted to be driven by said prime mover, a control instrument including a cam, means responsive to the speed of said dynamometer for driving said cam in one direction in response to an increase in the speed of said dynamometer and in equal amounts and opposite direction in response to equal decreases in said speed, a cam follower associated with said cam and means responsive to changes in the position of said cam follower for varying the load imposed by the dynamometer, said cam being readily replaceable with cams of various other contours by means of which other speed-torque loading characteristics may be imposed upon said prime mover without rearrangement of other portions of the apparatus.

3. In combination with a dynamometer adapted to be driven by a prime mover to vary the load on the latter, a control instrument including a cam, means responsive to the speed of said dynamometer for driving said cam in one direction in response to an increase in the speed of the dynamometer and for driving said cam in the opposite direction in response to a decrease in said speed, a cam follower associated with said cam and means responsive to changes in the position of said cam follower for varying the torque of the dynamometer, said cam having a contour which will cause variations in said torque in substantial accordance with the speed-time acceleration curve which the particular prime mover would follow in actual service.

4. In combination with a dynamometer adapted to be driven by a prime mover to vary the load on the latter, a control instrument including a cam, means responsive to the speed of said dynamometer for driving said cam in one direction in response to an increase in the speed of the dynamometer and for driving said cam in the opposite direction in response to a decrease in said speed, a cam follower associated with said cam and means responsive to changes in the position of said cam follower for varying the torque of the dynamometer, said cam having a contour which will cause variations in said torque in substantial accordance with the speed-time acceleration curve of a vehicle using substantially the same prime mover, and the apparatus being adapted to simulate road test conditions for vehicles of various speed-time acceleration characteristics by providing a cam of appropriate contour for the particular vehicle.

5. In combination with a load-imposing dynamometer adapted to be driven by an internal combustion engine, a control instrument including a cam, means responsive to the speed of said dynamometer for driving said cam in one direction in response to an increase in the speed of the dynamometer and in the opposite direction in response to a decrease in said speed, and means responsive to changes in the position of the cam for varying the load imposed by the dynamometer, said cam having a contour which will cause variations in the load imposed by said dynamometer in substantial accordance with any predetermined speed-time acceleration curve for a vehicle using substantially the same engine, and the apparatus being adapted to simulate road test conditions for vehicles of various speed-time acceleration characteristics by providing a cam of appropriate contour for the particular vehicle to be simulated.

6. An apparatus for simulating road test conditions for vehicles of various speed-time acceleration characteristics which comprises in combination a load imposing dynamometer adapted to be driven by an internal combustion engine substantially the same as used in the particular vehicle to be simulated, a control instrument including a cam, means responsive to the speed of said dynamometer for driving said cam in one direction in response to an increase in the speed of the dynamometer and in the opposite direction in response to a decrease in said speed, a cam follower associated with said cam, and means responsive to changes in the position of said cam follower for varying the load imposed by the dynamometer in accordance with the displacement of said cam follower, said cam having a contour corresponding substantially with a speed-time acceleration curve for the particular vehicle to be simulated.

7. The apparatus as set forth in claim 6 further characterized in that said cam has a contour corresponding substantially with a speed-time acceleration curve for the particular vehicle to be simulated plotted on a polar diagram.

JOHN S. BOGEN.
HERBERT A. HULSBERG.